United States Patent [19]

Vallat

[11] Patent Number: 5,094,612

[45] Date of Patent: Mar. 10, 1992

[54] GAS INJECTION PIPE FOR SEQUENTIAL BURNER IN GAS VARIABLE-POWER BOILERS

[75] Inventor: Didier Vallat, Orvault, France

[73] Assignee: Saunier Deval - Eau Chaude Chauffage - S.D.E.C.C., Fontenay Sous Bois, France

[21] Appl. No.: 439,306

[22] Filed: Nov. 21, 1989

[30] Foreign Application Priority Data

Nov. 24, 1988 [FR] France .................. 88 15335

[51] Int. Cl.⁵ .................................. F23D 21/00
[52] U.S. Cl. ............................ 431/280; 431/60; 239/446; 239/551
[58] Field of Search ............... 431/42, 60, 280; 239/66, 444, 446, 443, 557, 553; 137/867, 868, 883

[56] References Cited

U.S. PATENT DOCUMENTS

| | | |
|---|---|---|
| 1,591,228 | 7/1926 | Obenhaus et al. |
| 2,000,367 | 5/1935 | Williamson et al. ......... 239/66 X |
| 2,480,281 | 8/1949 | Begerow ..................... 239/66 |
| 2,586,224 | 2/1952 | Harris et al. .............. 239/444 X |
| 3,211,373 | 10/1965 | Miller . | 
| 3,233,997 | 2/1966 | Moreau ....................... 431/280 X |
| 3,372,708 | 3/1968 | Hotchkin .................... 239/66 X |

FOREIGN PATENT DOCUMENTS

| | | | |
|---|---|---|---|
| 0201253 | 8/1955 | Australia ..................... 431/12 |
| 672185 | 11/1965 | Belgium . | |
| 0718213 | 2/1942 | Fed. Rep. of Germany ...... 431/280 |
| 2454582 | 11/1980 | France . | |

Primary Examiner—Carl D. Price
Attorney, Agent, or Firm—Armstrong, Nikaido, Marmelstein, Kubovcik & Murray

[57] ABSTRACT

Gas injection pipe for a sequential burner in gas variable-power boilers. An array of gas injectors which are located on the injection pipe may each be plugged by a corresponding valve which is mounted on the free end of a rigid blade transversely extending through an internal chamber of the injection pipe. A rotating shaft which is stepwise driven is provided at right angles to each blade with recesses which are angularly offset on the shaft. Each blade is provided with a stud which is located in a corresponding recess when the latter is in its upward position. The stud lifts up the blade when the shaft is rotated on purpose to open the valve.

10 Claims, 3 Drawing Sheets

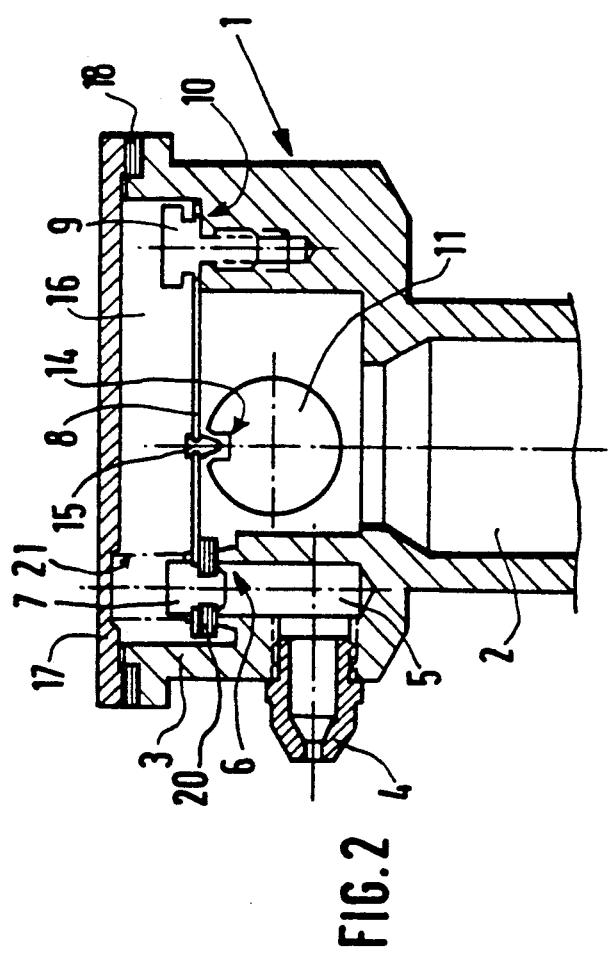
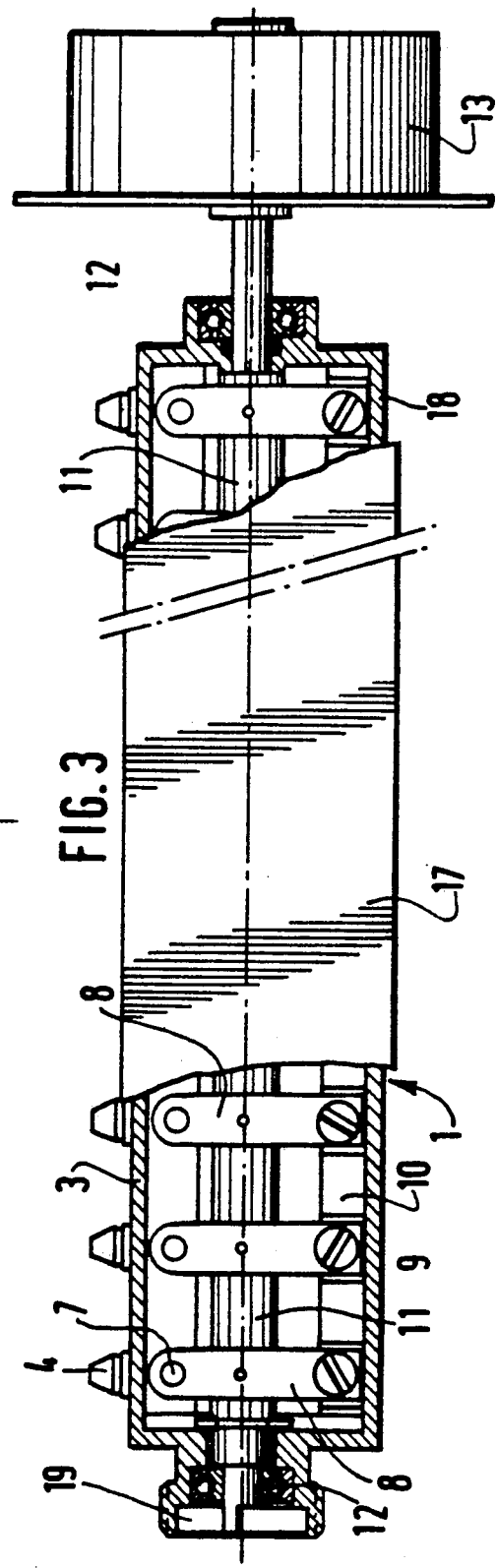
FIG.2
FIG.3

GAS INJECTION PIPE FOR SEQUENTIAL BURNER IN GAS VARIABLE-POWER BOILERS

BACKGROUND OF THE INVENTION

1. Field of the Invention

This invention generally relates to gas variable-power boilers. More particularly, this invention relates to a gas injection pipe at the burner arms which enables the gas to be variably supplied thereto.

2. Description of the Relevant Art

In gas heating devices and more precisely in the so-called "mixed" devices (i.e., the ones that operate both in central heating and in the supply of hot sanitary water), it is often required to modulate the power of any device with respect to the heating requirements for the relative flat, and it is for instance known that the required power is limited as to heating purposes, whereas it can be maximum with respect to the feeding thereof.

Mixed gas boilers intended to be affixed on walls are known, wherein a progressive regulation enables the gas flow rate at the burner to be so monitored that the power supplied by the boiler can be matched as close as possible to the heating needs.

Unfortunately, in the known structures of these boilers, the regulation range has to be downwardly limited at about a third of the nominal power of the relative boiler, since the yield drop of the boilers with respect to the relative decrease of the gas flow rate becomes substantially inadequate below the third portion of the nominal flow rate.

Since it is impossible to regulate the boiler power below 30%, this results in a drawback which is increasingly detrimental for mixed boilers at a time where the powers set up for heating houses would tend to decrease and where the powers for producing hot sanitary water would on the contrary tend to increase; thus, involving an increasingly large disparity between the power to be supplied when heating and the outlet power.

In order to avoid the above-discussed drawbacks and set up the regulation zone of the device as large as possible, the pipe on which are mounted the burner injectors is shared so as to provide at least two distinct injection pipes, one being fed so as to heat, whereas the other one are outlet-supplied, but this structural arrangement requires an additional electrovalve to be mounted on the usual gas equipment.

In variable-power devices, it is now preferable to use electrovalves having a progressive openings; thus, enabling when starting from a first opening threshold corresponding to a determined flow rate, a progressive increasing of the gas inlet rate; i.e., directly monitored by the intensity of the energizing current of the electrovalve solenoid. However, except the known drawbacks inherent to the mounting and adjustment of the electrovalves, it has appeared that, due to hysteresis problems, the opening of the profiled valve opening is not easily controlled.

In fact, whether or not the electrovalve solenoid is energized by increasing or decreasing intensities of the electric current, due to the hysteresis, the opening of the profiled valve for an even intensity is not identical, but depends whether or not the current is either in its rising phase or in its descending phase. As a result, the gas flow rate supplied to the burner is modified. Since the oxidizing air is shared into a primary air supplied to the burner arm and a secondary air, the gas regulation by means of a conventional electrovalve only substantially modifies the primary air flow rate, whereas the secondary air flow rate is kept substantially uniform, and as a result, the combustion yield is substantially lowered.

Independent from the hysteresis, the accuracy of the gas flow rate to be fed is directly bound to the accuracy of the progressive opening of the profiled valve and thus, it is very sensitive to size variations of the valve and the adjustment thereof as well.

SUMMARY OF THE INVENTION

In order to avoid the above-discussed drawbacks and simultaneously provide a simpler solution to the problem set up by the gas variations and power modifications, the Applicant has discovered a mechanism which is quite different from the electrovalves of all kinds, which mechanism no longer uses any electromagnetic members which could be subjected to hysteresis or resiliently biased multiple or profiled valves intended to free to a certain extent an opening for gas passage as a function of an intensity value. This mechanism is designed in order to lower the cost thereof, to simplify the mounting thereof and to enable an effective and suitable operation thereof. As a result, this mechanism enables the gas flow rate supplied to the burners to be regulated.

It is an object of this invention to provide a gas injection pipe for a sequential burner in a gas variable-power boiler which is energized by an electric control signal supplied from a regulation and control device on purpose in order to pilot the gas flow rate fed to the burner as a function of the heating demand, wherein the injection pipe is provided with an array of gas injectors able to each be plugged by means of a plugging member, one for each injector, and that each plugging member is moved from a closure position thereof to an opening position thereof by means of either at least a hollow portion or at least a projecting portion of a rotating shaft driven by a motor, said portion being located opposite said plugging member. Each hollow or projecting portion is possibly angularly offset with respect to the adjacent portions so that at each angular position taken by the rotative shaft from any stop position, at least one hollow or projecting portion would act on at least one plugging member on purpose to open it while supplying a gas flow rate to the corresponding injector.

In this invention, each injector is fed through a supply recess which is located within the injection pipe and has a top opening connected to an internal chamber which is plugged by means of a valve provided with a lining; thus, constituting a plugging member. Further, each valve is mounted at the free or affixed end of a rigid or flexible blade extending through the chamber, whereas the other end of said blade is either affixed or free, the array of blades being transversely located above the rotating shaft, the valve tightness being ensured either by the blade resiliency or by a resilient means (such as, a spring) which keeps the valve in supporting relationship to the seat thereof, the opening of the valve being, in that case, ensured by means of a rigid blade.

Moreover, in this invention, the hollow portion which is provided into the rotating shaft at right angles to each blade has a recess wherein a small stud is affixed to the central area of said blade, certain recesses being as large so as to cover a greater angular sector on the shaft; thus, forming therein a transverse groove wherein the stud may substantially move without urging the blade.

Advantageously, both profiles of the recesses and stud having been studied and so designed that the edges of each recess would act as cam means on the edges of each stud on purpose to improve the uprising of the blades.

According to an alternative embodiment of this invention, the projecting portion provided on the rotating shaft at right angles to each blade is a cam member which directly engages the corresponding blade.

BRIEF DESCRIPTION OF THE DRAWINGS

Other features and advantages of the invention will be better appreciated in view of the following description of a non-limiting embodiment, with reference to the accompanying drawings in which:

FIG. 2 is a cross-sectional view of the injection pipe.

FIG. 3 is a top view of the injection pipe which is partially broken away.

DETAILED DESCRIPTION OF THE PREFERRED EMBODIMENTS

Figure 1:
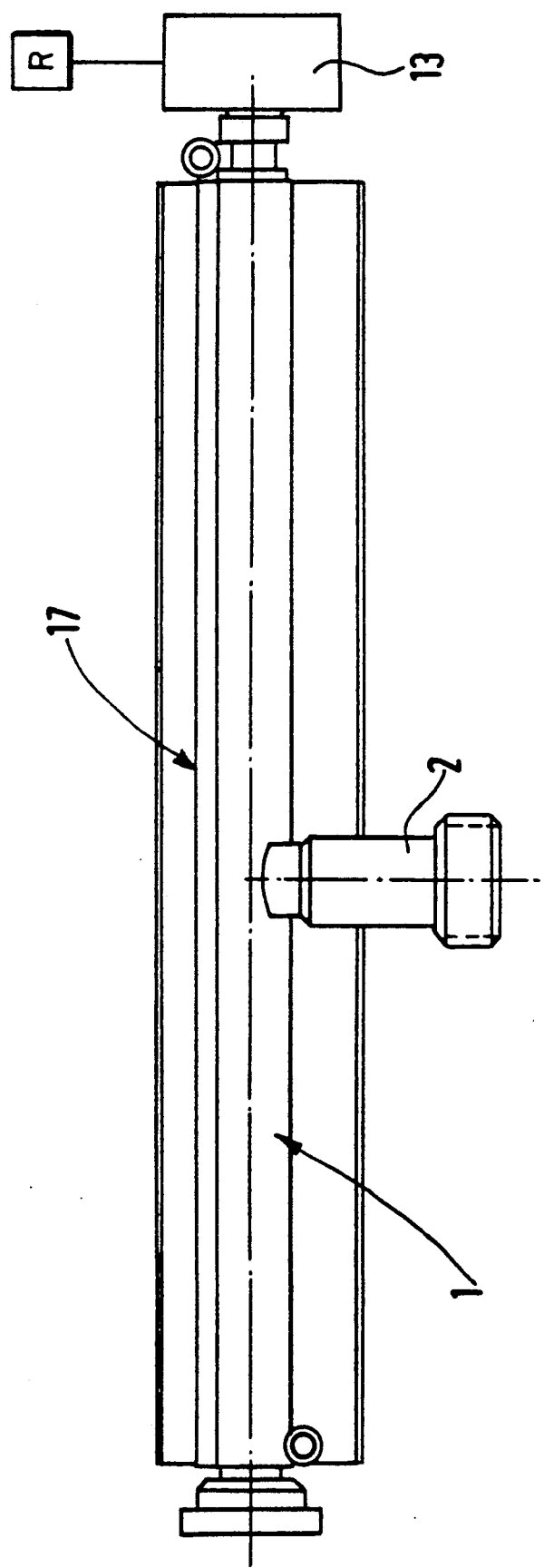
FIG. 1 is a general elevational view of a burner injection pipe.

As shown in the drawings, the injection pipe 1 is an elongated profiled member into which the gas is supplied through an inlet duct 2. The internal longitudinal chamber 16 which is the gas supplying chamber is closed at the top portion thereon by a plate 17, the tightness being ensured by a seal 18. The removable plate 17 allows easy access into chamber 16 to adjust the internal members, as hereinafter described.

On a lateral side 3 of the injection pipe are located an array of injectors 4 having the same nozzle size in accordance with the kind of gas to be fed and extending from one end of the pipe to another. Each injector 4 is supplied via a feeding recess 5 provided with the injection pipe. The top opening 6 of the recess, which is connected to the internal chamber 16 of pipe 1, is plugged by means of a small valve 7 having a lining 20 which forms a plugging means. The valve is mounted on the free end of a rigid blade 8 which transversely passes through the internal chamber 16, whereas the other end of the blade is freely maintained by means of a screw 9 on a should 10 provided opposite thereto within the injection pipe. The valve 7 is kept on its seat so as to close the opening 6 by means of a small spring 21 which bears on the plate 17. Within the injection pipe and along the whole length thereof, there is provided under the array of blades 8 a shaft 11 which may rotate within a suitable bearing provided at each end of the injection pipe. The stepwise rotation of shaft 11 is ensured by a stepwise motor coupled to one end of the shaft. At right angles to each blade 8, there is provided on the shaft a recess 14, each recess having a particular axial orientation which is different with respect to the opposite blade. Each blade is provided with a small central stud 15 intended to enter into a recess 14 when the latter is upwardly oriented as shown in FIG. 2. It should be understood that, in this case, the rigid blade has a horizontal location in which the small valve 7 provided with its lining 20 is applied onto opening 6 so as to plug recess 5, when biased by means of a spring 21; thus, hindering any gas transfer to the corresponding injector 4. On the contrary, if the shaft is rotated by one step by means of the stepwise motor 13, than recess is angularly moved and stud 15, which is thus released from said recess, moves to bear against the shaft so as to lift up blade 8 by a counter-biased action on spring 21. The lining 20 of valve 7 is moved away from its seat so as to open the relative bore 6. It is noted that, for each injector, the shaft 11 is possibly provided with a plurality of recesses on the periphery thereof. Thus, there is an angular position of the shaft, wherein all the recesses, except one, are located toward; i.e., a sole blade is lifted up and a sole injector is provided for supplying the gas. Thus, the gas flow rate is minimum. On the contrary, there is another angular location for the shaft, wherein all the recesses are moved downwardly and accordingly, all the injectors are open since all the studs 15 abut against the shaft body. Thus, the gas flow rate is at a maximum so as to provide maximum power. Due to the fact that a plurality of recesses could be precisely oriented with respect to each other, a variable number of injectors may be opened so as to provide as many power levels as injectors. Also, there is an angular position of the shaft, wherein all the recesses are aligned as they upwardly move, and accordingly, all the blades 8 are in the plugging position, whereas the bores 6 are closed. Thus, the injection pipe may act as a stop member as the gas is fed to the burner.

The relative profile of the recesses 14 and the studs 15 is so designed that the edges of each could act as a cam means on the edges of each stud and that the lifting of the blades can be easily ensured without any risk of blocking. It is further noted that certain recesses 14 are so designed so as to cover a substantial angular sector of shaft 11; thus, forming a transverse groove which enables the shaft to rotate without abutting against the relative stud 15 since any fixed stud can run along the would length of the groove without acting on the blade.

Figure 4:
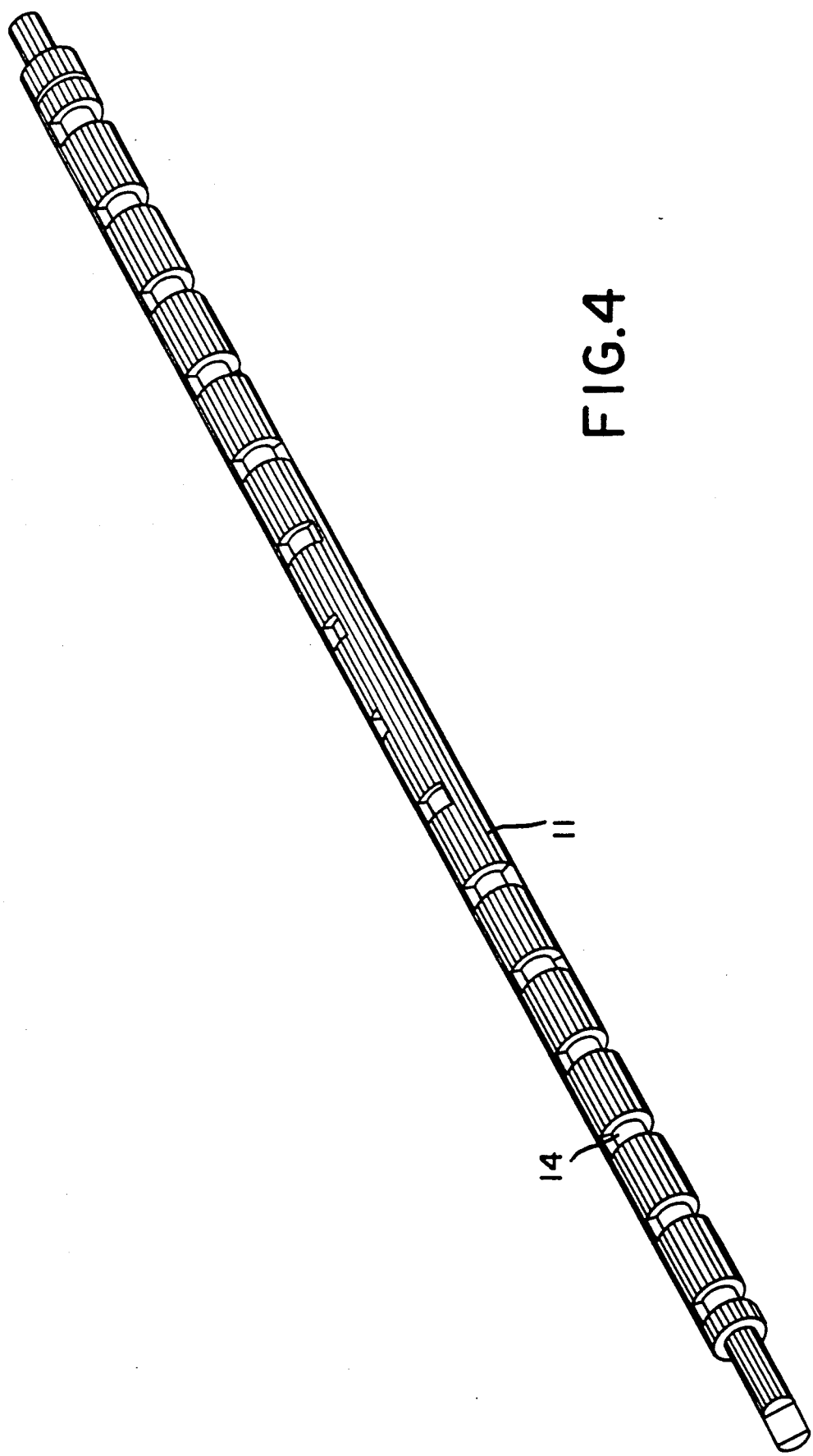
FIG. 4 is a perspective view of the shaft having hollow portions arranged in an angularly offset manner.

As illustrated in FIG. 4, the hollow portions 14 of the shaft 11 may be arranged in an angularly offset manner.

It is further noted that, in FIG. 3, a spring 19 is mounted at the end of the shaft 11 so as to bias the shaft in a predetermined rest position which would correspond, for instance, to the alignment of all the recesses 14 located upwardly; i.e., when all the injectors are closed. When the apparatus is not ready to be operated, the gas is fed to chamber 16 at the supply pressure. The shaft 11 is kept in a position wherein all the recesses 14 are aligned in the upward location thereof, thus, preventing any gas exit through any injector.

As a control electric signal is applied to motor 13 via the regulating device R with the signal corresponding to the desired power, the motor 13 is rotated by the required step number, and all the recesses (due to the angular width thereof) would not act on the studs, except a number of recesses which would drive the corresponding studs on purpose to lift up the blades 8. A gas flow rate set up by the regulating device is supplied to the burners from the injectors 4. As the control signal is varied, the motor rotates by a relative step number so as to release a number of studs from the corresponding recesses; thereby, opening a few injectors so as to supply a larger gas flow rate.

After the operation is completed, as the motor is not energized, the mechanism is set to zero as the shaft 11 is driven back by spring 10 to its original position, wherein all the injectors are closed, the injection pipe acting as a stop member for the gas supply to the burners.

The use of a stepwise motor avoids any monitoring device and allows an open loop to be embodied so as to provide a better accuracy of location. Then, the control unit of the stepwise motor is a conventional one-turn positioning control unit. Each position corresponds to a power level and, as hereinabove stated, the power may be lowered to that corresponding to one operated injector while providing very good performances with respect to both combustion and inter-ignition.

The sequential burner associated to the type of gas injection pipe only comprises a few constitutive members. Whether the nature of the gas is modified, it would be sufficient to substitute the injectors for suitable ones.

The mechanism thus described may include a number of alternative embodiments, especially with respect to shaft 11; i.e., projecting cam means could be provided on the shaft instead of recesses 14 intended to cooperate with studs 15, each cam means having a peculiar orientation at right angles to the blades 8. According to the angular position thereof, each cam means would either directly or indirectly engage the corresponding blade 8 so as to lift up the latter and consequently, release the valve from its seat. The blade can also be resilient, while having its proper resiliency so as to be biased back to a horizontal position on purpose to plug bore 6. In this manner, the other end of the blade is affixed by a screw 9; thus, avoiding the use of a small spring 21.

While the invention has been particularly shown and described in reference to preferred embodiments thereof, it will be understood by those skilled in the art that changes in form and details may be made therein without departing from the spirit and scope of the invention.

What I claim is:

1. A gas injection pipe for a sequential burner in a gas variable-power boiler, comprising:
   a regulation and control means for supplying an electric control signal to pilot gas flow fed to said burner as a function of heating demand;
   an array of gas injectors, each gas injection having a plug member which is movable from a closure position to close said gas injector and to an opening position to open said gas injector;
   a rotatable shaft operably connected to and driven by a motor, said motor being operably connected to said regulation and control means, said rotatable shaft having at least a hollow portion, said hollow portion being located opposite said plug member and being arranged in an angularly offset manner with respect to adjacent portions so that at each angular position taken by said rotating shaft at any stop position, said hollow portion opens a corresponding plug member in order to supply a flow of gas to a corresponding one of said gas injectors, said plug member being connected to a blade extending adjacent said rotating shaft, and said plug member communicating with said rotating shaft.

2. The injection pipe as set forth in claim 1, wherein each injector is fed through a supply recess which is located within an injection pipe and having a top opening connected to an internal chamber which is plugged by a valve provided with a lining making up said plug member.

3. The injection pipe as set forth in claim 2, wherein each valve is mounted on one end of a rigid blade biased by a spring, said blade transversely extending through said chamber, wherein another end of said blade is movable, an array of blades being transversely located above the rotating shaft.

4. The injection pipe as set forth in claim 2, wherein each valve is mounted non a free end of a resilient flexible blade which transversely extends through the chamber, wherein another end of said blade is fixed, an array of blades being transversely located above the rotating shaft.

5. The injection pipe as set forth in claim 1, wherein the rotating shaft is driven by a stepwise motor and biased to a predetermined rest position by a spring which is mounted at one end of said shaft.

6. The injection pipe as set forth in claim 1, wherein the hollow portion provided in the rotating shaft at right angles to each blade is a recess engageable with a stud which is affixed to a central potion of said blade.

7. The injection pipe as set forth in claim 6, wherein recesses cover an angular sector on the shaft so as to form a transverse groove along which the stud can move without engaging the blade.

8. The injection pipe as set forth in claim 6, wherein a profile of the recesses and studs is in a manner so as to act as a cam on the edges of each stud to improve the lifting of the blades.

9. The injection pipe as set forth in claim 6, wherein an internal chamber of an injection pipe which is a portion of the gas supply chamber is tightly closed at an upper portion thereof by a removable plate.

10. The injection pipe as set forth in claim 1, wherein the projecting portion of the rotating shaft at right angles to each blade is a cam which directly engages the corresponding blade.

* * * * *